(12) United States Patent
Tuck et al.

(10) Patent No.: US 6,711,576 B1
(45) Date of Patent: Mar. 23, 2004

(54) METHOD AND APPARATUS FOR IMPLEMENTING COMPACT TYPE SIGNATURES IN A VIRTUAL MACHINE ENVIRONMENT

(75) Inventors: Richard D. Tuck, San Francisco, CA (US); Dean R. E. Long, Boulder Creek, CA (US); John Rose, San Jose, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 280 days.

(21) Appl. No.: 09/844,571

(22) Filed: Apr. 26, 2001

Related U.S. Application Data
(60) Provisional application No. 60/211,002, filed on Jun. 12, 2000.

(51) Int. Cl.[7] .............................................. G06F 17/30
(52) U.S. Cl. ...................................... 707/100; 707/101
(58) Field of Search ................................. 707/100, 101, 707/102, 103, 104; 709/330; 717/127

(56) References Cited

U.S. PATENT DOCUMENTS

| | | | |
|---|---|---|---|
| 5,918,053 A | * 6/1999 | Graham | ....................... 717/127 |
| 6,457,066 B1 | * 9/2002 | Mein et al. | .................. 709/330 |

OTHER PUBLICATIONS

K.C. Hopson, Stephan E. Ingram, "Developing Professional Java™ Applets", Oct. 12, 1998, http://www.kaposnet.hu/books/profiapplet/index.htm and http://www.kaposnet.hu/books/profiapplet/ch10.htm.

Sun Microsystems Inc., "The Java Virtual Machine Specification, Release 1.0 Beta DRAFT", Aug. 21, 1995, http://www.di002.edv.uniovi.es/procesadores/Download/Java/Bytecodes/vmspec.pdf.

"Les bases informatiques—Le codage de information" Nov. 14, 1999, http://www.up.univ-mrs.fr/wcilsh/cour/s infZ10/cours56/Z10 C6.htm.

International Search Report from corresponding PCT application. Aug. 2, 2002.

* cited by examiner

*Primary Examiner*—Sanjiv Shah
(74) *Attorney, Agent, or Firm*—Beyer Weaver & Thomas LLP

(57) ABSTRACT

Methods and apparatus for creating compacted method signatures from method signature representations in Java™ class files are disclosed. The use of compacted signatures reduces the amount of memory space occupied by the signatures and, further, improve the efficiency with which a virtual machine may operate. According to one aspect of the present invention, a method a method for creating a compact representation of a method signature using a virtual machine includes creating 4-bit representations for each of a first parameter, a separator, and a return type included in the method signature. Once the 4-bit representation are created, the representations are packed into a word. In one embodiment, the word is a 32-bit word. In such an embodiment, the 32-bit word may be a 32-bit integer.

15 Claims, 4 Drawing Sheets

METHOD AND APPARATUS FOR IMPLEMENTING COMPACT TYPE SIGNATURES IN A VIRTUAL MACHINE ENVIRONMENT

CROSS REFERENCE TO RELATED APPLICATION

This application takes priority under U.S.C. 119(e) of United States Provisional Application No.: 60/211,002 filed Jun. 12, 2000 entitled, "METHOD AND APPARATUS FOR IMPLEMENTING COMPACT TYPE SIGNATURES IN A VIRTUAL MACHINE ENVIRONMENT" by Tuck et. al. which is incorporated by reference in its entirety.

BACKGROUND OF THE INVENTION

1. Field of Invention

The present invention relates generally to computing systems which include virtual machines. More particularly, the present invention relates to compactly representing parameter-passing and value-returning type information of a method.

2. Description of the Related Art

Within an environment which includes a virtual machine, e.g., a Java™ virtual machine developed by Sun Microsystems, Inc. of Palo Alto, Calif., classes are often loaded and unloaded in the process of executing the virtual machine, as will be understood by those skilled in the art. The format of the class files may vary depending upon the requirements of the environment. By way of example, in a Java™ virtual machine environment, the class files may include files which are in a Java™ class format as is described in The Java™ Virtual Machine Specification by Tim Lindholm and Frank Yellin (ISBN 0-201-63452-X), which is incorporated herein by reference.

In a Java™ class file format, substantially all references to methods, which may be considered to be routines or subroutines, have an associated type signature. The type signature may be an external signature, and is arranged to provide parameter types expected by the method, as well as the return type of the method. A type signature is typically represented as a sequence of 8-bit characters, and often consumes a relatively large amount of memory space. The sequence generally includes a method-type beginning marker, parameters which are each represented by a character, a separater character, and a character which represents the return type. In some situations, as for example when types are class types or arrays, the type signature may occupy additional memory space to provide either the name of a class or the depth of an array.

Many standard implementations of a virtual machine, e.g., a Java™ virtual machine, translate a type or external signature representations into internal data structures which are used by the virtual machine. The data structures associated with type signature representations are generally not of a fixed length, e.g., the data structures associated with type signature representations are strings of a variable length. The length of the data structures is not of a fixed length due at least in part to the fact that the number of parameters in a type signature may vary. As such, the data structures associated with type signature representations are often inefficient. That is, efficient data structures are typically of fixed length, and the data structures associated with type signature representations are of variable length. As a result, standard implementations of a virtual machine often include the use of a pointer, e.g., a 4-byte pointer, to the variable-length signature. Such a pointer may be independently allocated in memory. The use of such a pointer further increases the amount of memory space that is used within the virtual machine environment.

By translating type signature representation into internal data structures and, further, by implementing pointers to a variable-length signature, when a virtual machine requires the comparison of compare two signatures, the virtual machine must implement a variable-length, character-by-character comparison. Such a comparison is time-consuming and, therefore, often degrades the performance of the virtual machine.

In some implementations of a virtual machine, e.g., a Java™ virtual machine, in order to avoid the need to perform variable-length, character-by-character comparison, a table which lists substantially all method signatures may be used. Specifically, such a table may be used to effectively "look up" all new signatures to determine if the new signatures have a match within the table. Once a new signature is looked up, a comparison of signatures involves a character-pointer comparison. Although such a comparison is more efficient that a variable-length, character-by-character comparison, the signatures still often require a significant amount of memory.

Therefore, what is desired is an efficient method for implementing and processing method signatures. More particularly, what is needed is a method and an apparatus for reducing the amount of memory space and the amount of overhead associated with implementing and processing method signatures with respect to a virtual machine.

SUMMARY OF THE INVENTION

The present invention relates to creating and implementing compacted method signatures from method signature representations in Java™ class files. The use of compacted signatures reduces the amount of memory space occupied by the signatures and, further, improve the efficiency with which a virtual machine may operate. According to one aspect of the present invention, a method a method for creating a compact representation of a method signature using a virtual machine includes creating 4-bit representations for each of a first parameter, a separator, and a return type included in the method signature. Once the 4-bit representation are created, the representations are packed into a word. In one embodiment, the word is a 32-bit word. In such an embodiment, the 32-bit word may be a 32-bit integer.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

In the following description, numerous specific details are set forth in order to provide a thorough understanding of the present invention. It will be apparent, however, to one skilled in the art that the present invention may be practiced without some or all of these specific details. In other instances, well known structures or operations have not been described in detail in order to not unnecessarily obscure the invention.

Within a Java™ virtual machine, the use of method signatures, or type signatures associated with a method, typically requires iterating through all parameters and the return type contained in a signature. Such an iteration is required to determine the size of each piece of data. In this type of implementation, classes and arrays are effectively treated as being equivalent, since the classes and arrays are substantially all data pointers of the same size. In some cases, a second representation of a method signature, e.g., a "terse signature" which allows for speedy processing of this data, may be implemented in addition to a standard, "full" signature.

As the use of full method signatures such as those created in Java™ class files often consumes a relatively significant amount of memory space and the processing of such signatures may be time-consuming, reducing the amount of space occupied by the method signatures within a virtual machine would improve the performance of the virtual machine. Hence, full method signature representations included in Java™ class files may be substantially compacted once the Java™ class file or, more specifically, the method signature representations associated with the Java™ class file are effectively read into the virtual machine.

When a method signature representation in a Java™ class file is read into a Java™ Virtual Machine, the method signature may be processed. In one embodiment, each signature that is read into a virtual machine may be reduced to a sequence of numbers, e.g., 4-bit numbers, and an array of classes or an array of arrays. Alternatively, each signature may be reduced to a sequence of numbers in addition to both an array of classes and an array of arrays.

Figure 1:
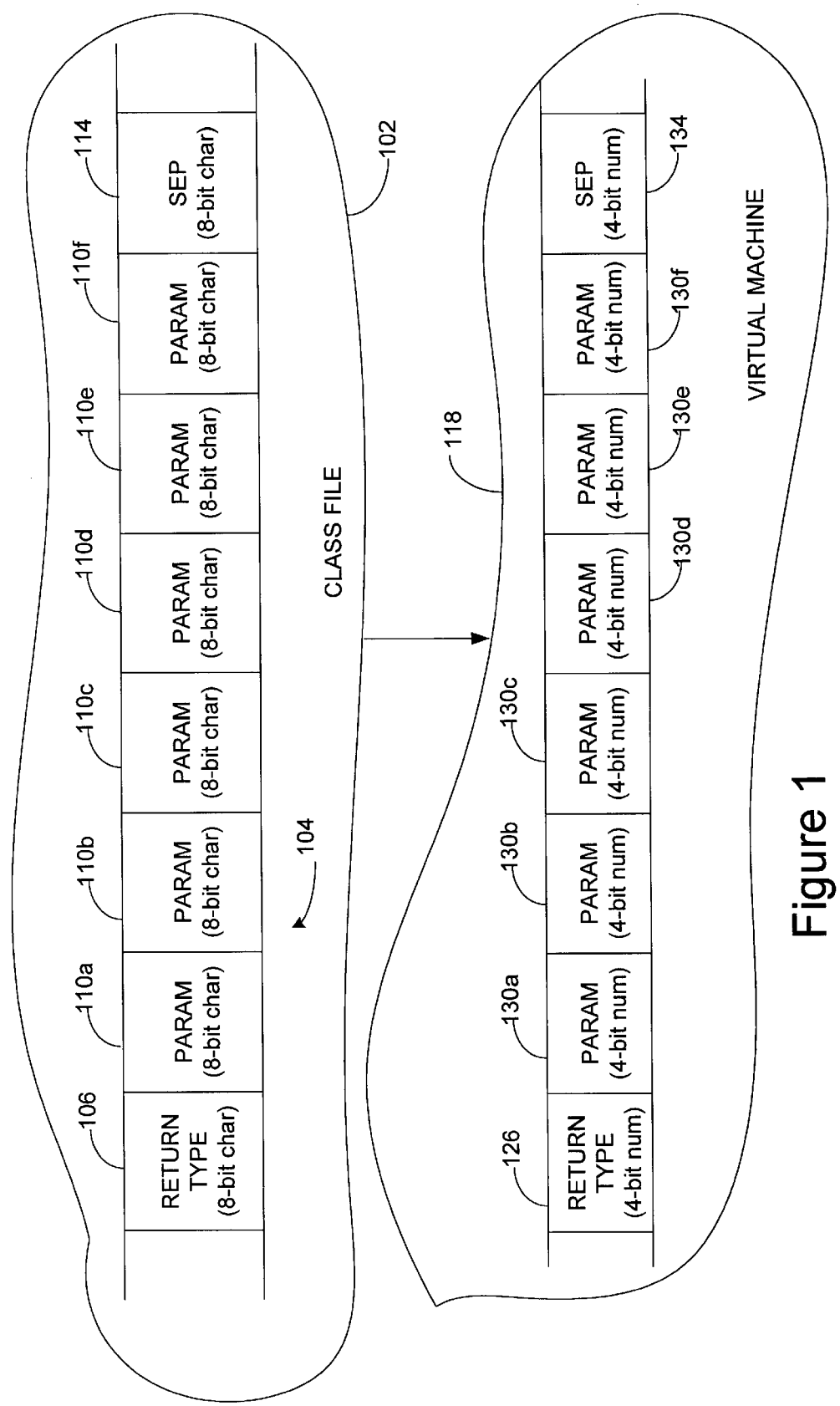
FIG. 1 is a diagrammatic representation of a signature created in a class file and a compacted representation of the signature after the signature is processed by a virtual machine in accordance with an embodiment of the present invention.

FIG. 1 is a diagrammatic representation of a signature created in a class file and a compacted representation of the signature after the signature is processed by a virtual machine in accordance with an embodiment of the present invention. A class file 102 includes a signature 104 which may be a method type, a type signature, or a method signature. Signature 104 generally includes a sequence of 8-bit characters which represent a return type 106, parameters 110, and a separation character or terminator 114. In general, signature 106 includes six parameters 110 or less.

When class file 102 is read into a virtual machine 118, signature 104 is effectively reduced, e.g., compacted or compressed, into a reduced signature 124 which may be considered to be a terse signature. In the described embodiment, a terse signature is a compact representation of enough parameter-passing and value-returning type information of a method to allow the passing of information between stacks, e.g., a Java™ stack and a C stack.

Reduced signature 124 includes what is effectively a sequence of 4-bit numbers which correspond to the 8-bit characters associated with signature 104. By way of example, an 8-bit return type 106 may be represented by a 4-bit return type 126 in reduced signature 124, and 8-bit separation character 114 may be represented in reduced signature 124 as a 4-bit separation number 134. Similarly, parameters 110 represented as 8-bit characters within signature 104 may be encoded as 4-bit parameters 130 within reduced signature 124. In general, it should be appreciated that any suitable algorithm may be used to encode 8-bit characters as 4-bit numbers.

Since signature 104 typically has six or fewer parameters 110, as mentioned above, the eight 4-bit numbers associated with reduced signature 124 may typically be packed into a 32-bit integer. For each parameter 130 or return type 126 that is a class or an array type, an entry from the array of classes or arrays, respectively, may be chosen such that return type 126 is chosen first, followed by parameters 130 from left to right with respect to reduced signature 124.

In one embodiment, the classes and arrays may be reduced to 16-bit numbers which are composed of array depth and an index into an array of classes. As will be understood by those skilled in the art, a class name substantially only appears in this array one time. In general, method type signatures 106 reference two or fewer classes. As such, a 32-bit computer word or a 32-bit integer may be used to hold either two or fewer classes references, or a pointer to a separately-allocated array of 16-bit class numbers. Such an array will be described below with reference to FIG. 2.

Figure 2:
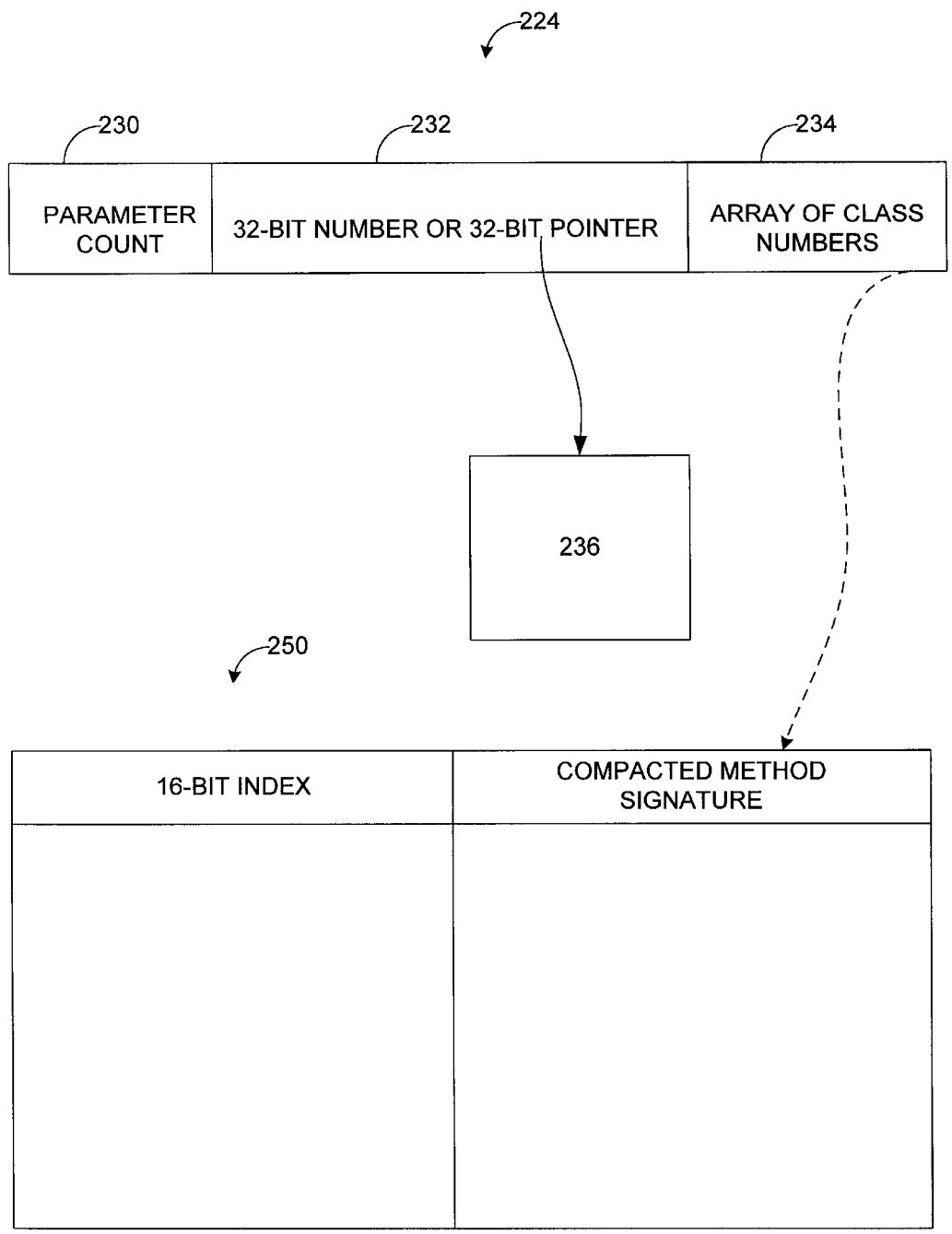
FIG. 2 is a diagrammatic representation of a compacted method signature and a look-up table that includes indexes and compacted method signatures in accordance with an embodiment of the present invention.

After being read into a virtual machine, a method signature, e.g., a signature which includes reduced signature 124 of FIG. 1, includes a parameter count and an array of class numbers. In addition, the method signature includes either a sequence of 4-bit numbers which are represented as a single 32-bit number, as described above, if the parameters associated with the method signature fit into a single 32-bit number, or a 32-bit pointer to a separately-allocated data structure. FIG. 2 shows an example of a method signature 224 which includes a parameter count 230, either a 32-bit number of a 32-bit pointer 232, and an array of class numbers 234 in accordance with an embodiment of the present invention. Method signature 224 is effectively a representation of the reduced, or terse, signature of FIG. 1 with a list of classes, e.g., array of class numbers 234. Array of class numbers 234, is a representation of an array of classes or an array of arrays which may be collected while the terse signature of FIG. 1 is being created.

When a method signature includes more than six parameters, then a 32-bit number may not be generated to represent a sequence within the method signature. If such is the case, then a 32-bit pointer may be generated to identify a separately-allocated data structure 236, as shown. Such a data structure 236 may be used to store, for example, the parameters, return types, and separater characters which were not compressed into a 32-bit number.

Method signature 224, which is a reduced version of a full signature that is included in a class filed, is typically looked up in a table 250, and inserted into table 250 if method signature 224 is not already present in table 250. If method signature 224 is inserted into table 250, then a 16-bit index may be assigned to essentially identify method signature 224. It should be appreciated that within table 250, a method signature appears at most once. As such, two uses of the same signature would result in two references to the same table entry.

A 16-bit index that is derived and assigned to method signature 224 may be used in substantially any internal virtual machine data structures where a method signature is required. The use of 16-bit indexes in internal data structures saves space over 32-bit pointers which are typically used with respect to a table of method signatures. The 16-bit indexes or numbers may be compared for equality when method signature comparison is required using substantially any suitable method. Suitable methods are described in Appendix A.

The overall method signature table entries in a method table, e.g., table 250 of FIG. 2, are compact, and, as a result, are relatively easy to use for further processing. By way of example, when iterating over only the partial type information, as will be appreciated by those skilled in the art, the packed sequence of 4-bit numbers may be inspected substantially directly. However, when iterating over full type information for the parameters, the iteration may begin with the packed sequence of 4-bit numbers, but may further be augmented by an array of class numbers.

Figure 3:
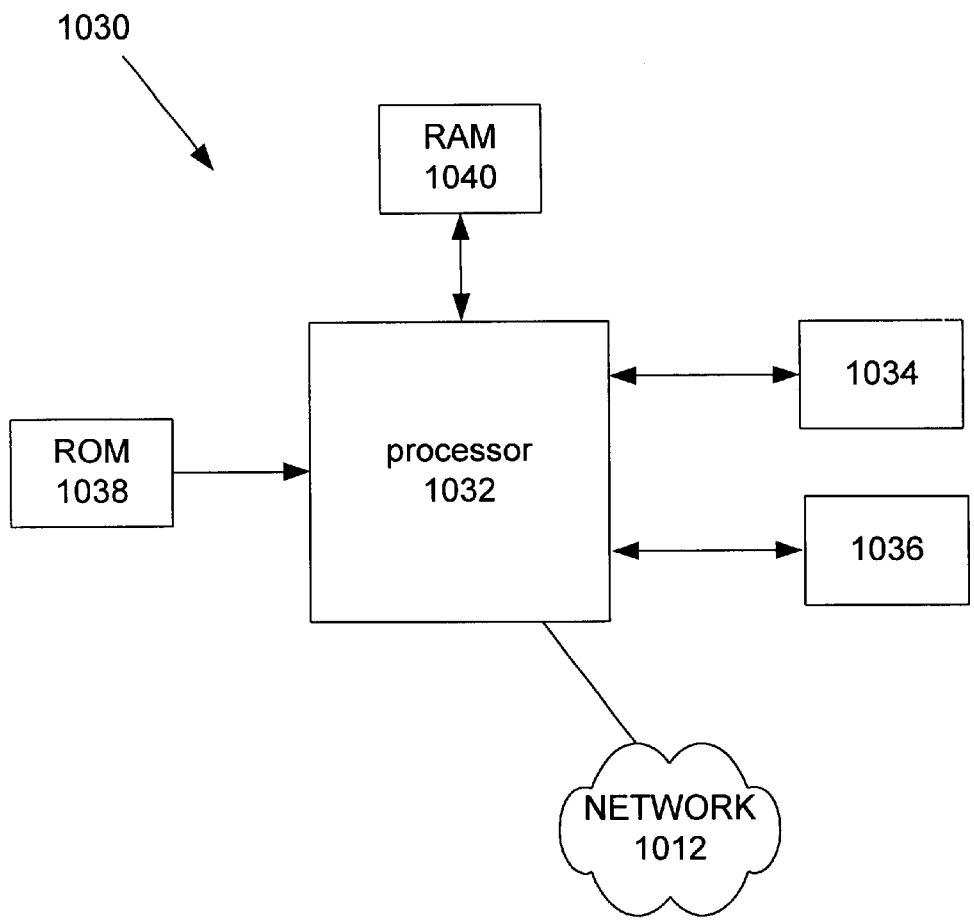
FIG. 3 is a diagrammatic representation of a general-purpose computer system suitable for implementing the present invention.

FIG. 3 illustrates a typical, general-purpose computer system suitable for implementing the present invention. The computer system 1030 includes at least one processor 1032 (also referred to as a central processing unit, or CPU) that is coupled to memory devices including primary storage devices 1036 (typically a read only memory, or ROM) and primary storage devices 1034 (typically a random access memory, or RAM).

Computer system 1030 or, more specifically, CPUs 1032, may be arranged to support a virtual machine, as will be appreciated by those skilled in the art. One example of a virtual machine that may be supported on computer system 1030 will be described below with reference to FIG. 4. As is well known in the art, ROM acts to transfer data and instructions uni-directionally to the CPUs 1032, while RAM is used typically to transfer data and instructions in a bi-directional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an internet network or an intranet network, using a network connection as shown generally at 1012. With such a network connection, it is contemplated that the CPUs 1032 might receive information from the network, or might output information to the network in the course of performing the above-described method steps. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

Figure 4:
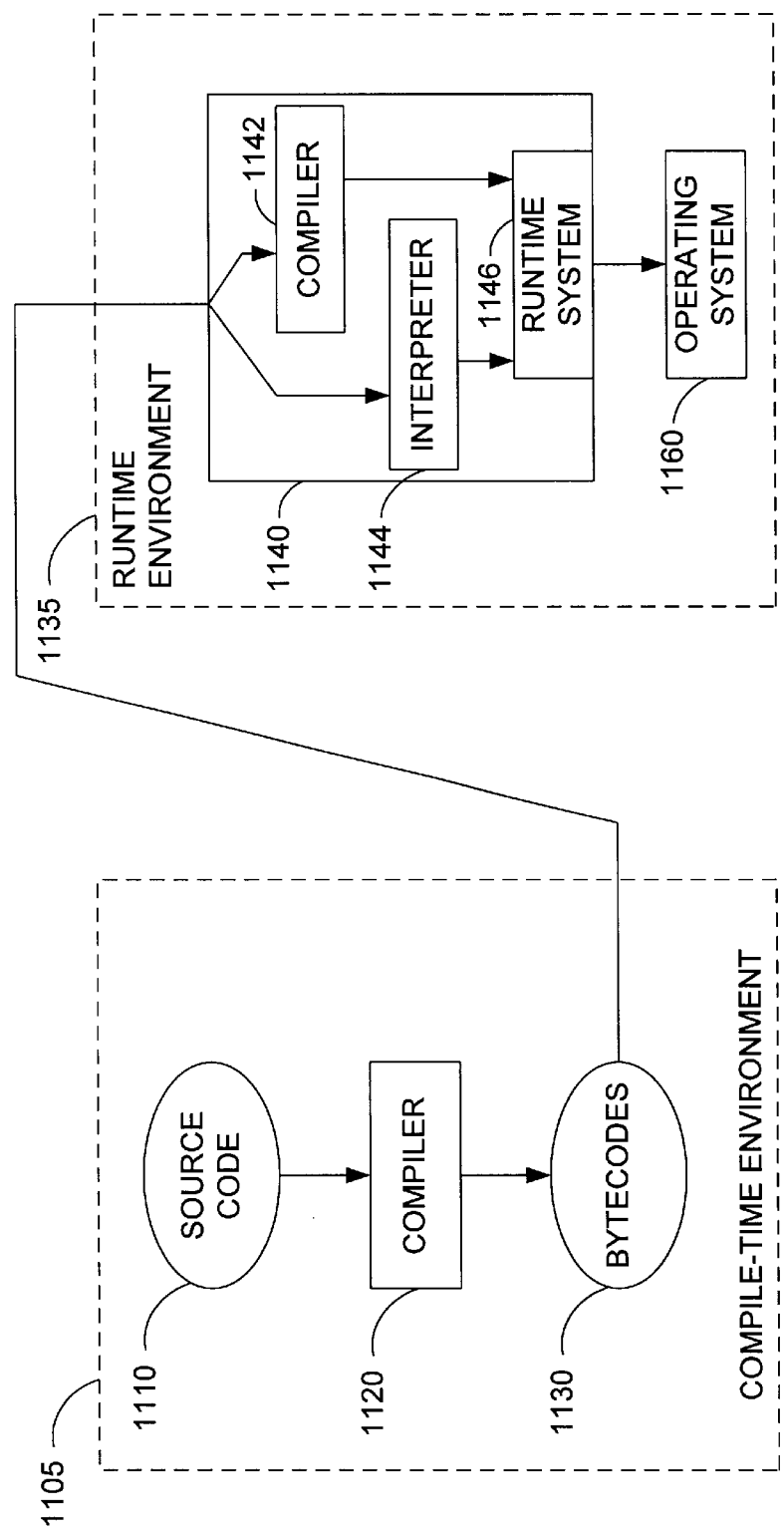
FIG. 4 is a diagrammatic representation of a virtual machine suitable for implementing the present invention.

As previously mentioned, a virtual machine may execute on computer system 1030. FIG. 4 is a diagrammatic representation of a virtual machine which is supported by computer system 1030 of FIG. 3, and is suitable for implementing the present invention. When a computer program, e.g., a computer program written in the Java™ programming language, is executed, source code 1110 is provided to a compiler 1120 within compile-time environment 1105. Compiler 1120 translates source code 1110 into bytecodes 1130. In general, source code 1110 is translated into bytecodes 1130 at the time source code 1110 is created by a software developer.

Bytecodes 1130 may generally be reproduced, downloaded, or otherwise distributed through a network, e.g., network 1012 of FIG. 3, or stored on a storage device such as primary storage 1034 of FIG. 3. In the described embodiment, bytecodes 1130 are platform independent. That is, bytecodes 1130 may be executed on substantially any computer system that is running on a suitable virtual machine 1140.

Bytecodes 1130 are provided to a runtime environment 1135 which includes virtual machine 1140. Runtime environment 1135 may generally be executed using a processor or processors such as CPUs 1032 of FIG. 3. Virtual machine 1140 includes a compiler 1142, an interpreter 1144, and a runtime system 1146. Bytecodes 1130 may be provided either to compiler 1142 or interpreter 1144.

When bytecodes 1130 are provided to compiler 1142, methods contained in bytecodes 1130 are compiled into machine instructions. In one embodiment, compiler 1142 is a just-in-time compiler which delays the compilation of methods contained in bytecodes 1130 until the methods are about to be executed. When bytecodes 1130 are provided to interpreter 1144, bytecodes 1130 are read into interpreter 1144 one bytecode at a time. Interpreter 1144 then performs the operation defined by each bytecode as each bytecode is read into interpreter 1144. That is, interpreter 1144 "interprets" bytecodes 1130, as will be appreciated by those skilled in the art. In general, interpreter 1144 processes bytecodes 1130 and performs operations associated with bytecodes 1130 substantially continuously.

When a method is invoked by another method, or is invoked from runtime environment 1135, if the method is interpreted, runtime system 1146 may obtain the method from runtime environment 1135 in the form of a sequence of bytecodes 1130, which may be directly executed by interpreter 1144. If, on the other hand, the method which is invoked is a compiled method which has not been compiled, runtime system 1146 also obtains the method from runtime environment 1135 in the form of a sequence of bytecodes 1130, then may go on to activate compiler 1142. Compiler 1142 then generates machine instructions from bytecodes 1130, and the resulting machine-language instructions may be executed directly by CPUs 1032. In general, the machine-language instructions are discarded when virtual machine 1140 terminates. The operation of virtual machines or, more particularly, Java™ virtual machines, is described in more detail in The Java™ Virtual Machine Specification by Tim Lindholm and Frank Yellin (ISBN 0-201-63452-X).

Although only a few embodiments of the present invention have been described, it should be understood that the present invention may be embodied in many other specific forms without departing from the spirit or the scope of the present invention. By way of example, although the present invention has generally been described as being suitable for use with respect to a Java™ virtual machine, the present invention may generally be used with respect to substantially any suitable virtual machine. Suitable virtual machines may include, but are not limited to, Smalltalk virtual machines.

In addition, it should be appreciated that the present invention may more generally be applied to other computer-language-processing environments as well. Specifically, in one embodiment, t generation of terse signatures may be applied within substantially any environment in which types are checked for parameter and return type matching, as for example an environment associated with compilers such as a Java™ compiler.

While compacted method signatures have been described as being 32-bit words, the number of bits associated with a compacted method signature may be widely varied depending upon the requirements of a particular system. The number of bits used to represent components of a compacted method signature may also be widely varied. For instance, in lieu of being represented as 4-bit numbers, the components such as a return type, a parameter, and a separater, may be represented as numbers with fewer bits. Alternatively, at least some of the components may be represented with additional bits without departing from the spirit or the scope of the present invention. Similarly, the number of bits used to represent indexes into a table of method signatures may also be widely varied. Therefore, the present examples are to be considered as illustrative and not restrictive, and the invention is not to be limited to the details given herein, but may be modified within the scope of the appended claims.

What is claimed is:

1. A method for creating a compact representation of a method signature using a virtual machine, the method signature including a first parameter, a separator, and a return type representation, the method comprising:
   creating a 4-bit representation for the first parameter of a method signature;
   creating a 4-bit representation for the separator of the method signature;
   creating a 4-bit representation for the return type representation of the method signature; and
   packing the 4-bit representation for the first parameter, the 4-bit representation for the separator, and the 4-bit representation for the return type representation into a word.

2. A method as recited in claim 1 wherein the word is an integer.

3. A method as recited in claim 2 wherein the word includes no more than approximately 32-bits.

4. A method as recited in claim 1 wherein the method signature further includes a second parameter, a third parameter, a fourth parameter, a fifth parameter, and a sixth parameter, further comprising:
   creating a 4-bit representation for the second parameter;
   creating a 4-bit representation for the third parameter;
   creating a 4-bit representation for the fourth parameter;
   creating a 4-bit representation for the fifth parameter;
   creating a 4-bit representation for the sixth parameter; and
   packing the 4-bit representation for the second parameter, the 4-bit representation for the third parameter, the 4-bit representation for the fourth parameter, the 4-bit representation for the fifth parameter and the 4-bit representation for the sixth parameter into the word.

5. An apparatus for creating a compact representation of a method signature using a virtual machine, the method signature including a first parameter, a separator, and a return type representation, comprising:
   means for creating a 4-bit representation for the first parameter of a method signature;
   means for creating a 4-bit representation for the separator of the method signature;
   means for creating a 4-bit representation for the return type representation of the method signature; and
   means for packing the 4-bit representation for the first parameter, the 4-bit representation for the separator, and the 4-bit representation for the return type representation into a word.

6. An apparatus as recited in claim 5 wherein the word is an integer.

7. An apparatus as recited in claim 6 wherein the word includes no more than approximately 32-bits.

8. An apparatus as recited in claim 5 wherein the method signature further includes a second parameter, a third parameter, a fourth parameter, a fifth parameter, and a sixth parameter, further comprising:
   means for creating a 4-bit representation for the second parameter;
   means for creating a 4-bit representation for the third parameter;
   means for creating a 4-bit representation for the fourth parameter;
   means for creating a 4-bit representation for the fifth parameter;
   means for creating a 4-bit representation for the sixth parameter; and
   means for packing the 4-bit representation for the second parameter, the 4-bit representation for the third parameter, the 4-bit representation for the fourth parameter, the 4-bit representation for the fifth parameter and the 4-bit representation for the sixth parameter into the word.

9. A method for creating a compact representation of a method signature using a virtual machine, the method signature including a first parameter a second parameter, a third parameter, a fourth parameter, a fifth parameter, and a sixth parameter, a separator, and a return type representation, the method comprising:
   creating a 4-bit representation for the first parameter of a method signature;
   creating a 4-bit representation for the separator of the method signature;
   creating a 4-bit representation for the return type representation of the method signature;
   creating a 4-bit representation for the second parameter of the method signature;
   creating a 4-bit representation for the third parameter of the method signature;
   creating a 4-bit representation for the fourth parameter of the method signature;
   creating a 4-bit representation for the fifth parameter of the method signature;
   creating a 4-bit representation for the sixth parameter of the method signature; and
   packing the 4-bit representation for the first parameter, for the second parameter, the 4-bit representation for the third parameter, the 4-bit representation for the fourth parameter, the 4-bit representation for the fifth parameter and the 4-bit representation for the sixth parameter, the 4-bit representation for the separator, and the 4-bit representation for the return type representation into a word.

10. A method as recited in claim 9 wherein the word is an integer.

11. A method as recited in claim 10 wherein the word includes no more than approximately 32-bits.

12. An apparatus for creating a compact representation of a method signature using a virtual machine, the method signature including a first parameter a second parameter, a third parameter, a fourth parameter, a fifth parameter, and a sixth parameter, a separator, and a return type representation, the method comprising:

means for creating a 4-bit representation for the first parameter of a method signature;

means for creating a 4-bit representation for the separator of the method signature;

means for creating a 4-bit representation for the return type representation of the method signature;

means for creating a 4-bit representation for the second parameter of the method signature;

means for creating a 4-bit representation for the third parameter of the method signature;

means for creating a 4-bit representation for the fourth parameter of the method signature;

means for creating a 4-bit representation for the fifth parameter of the method signature;

means for creating a 4-bit representation for the sixth parameter of the method signature; and means for packing the 4-bit representation for the first parameter, for the second parameter, the 4-bit representation for the third parameter, the 4-bit representation for the fourth parameter, the 4-bit representation for the fifth parameter and the 4-bit representation for the sixth parameter, the 4-bit representation for the separator, and the 4-bit representation for the return type representation into a word.

13. A computer program product for creating a compact representation of a method signature using a virtual machine, the method signature including a first parameter, a separator, and a return type representation, comprising:

computer code for creating a 4-bit representation for the first parameter of a method signature;

computer code for creating a 4-bit representation for the separator of the method signature;

computer code for creating a 4-bit representation for the return type representation of the method signature;

computer code for packing the 4-bit representation for the first parameter, the 4-bit representation for the separator, and the 4-bit representation for the return type representation into a word; and a computer readable medium for storing the computer code.

14. A computer program product as recited in claim 13 wherein the word is an integer.

15. A computer program product as recited in claim 13 wherein the method signature further includes a second parameter, a third parameter, a fourth parameter, a fifth parameter, and a sixth parameter, further comprising:

computer code for creating a 4-bit representation for the second parameter;

computer code for creating a 4-bit representation for the third parameter;

computer code for creating a 4-bit representation for the fourth parameter;

computer code for creating a 4-bit representation for the fifth parameter;

computer code for creating a 4-bit representation for the sixth parameter; and computer code for packing the 4-bit representation for the second parameter, the 4-bit representation for the third parameter, the 4-bit representation for the fourth parameter, the 4-bit representation for the fifth parameter and the 4-bit representation for the sixth parameter into the word.

* * * * *